United States Patent [19]
Shibano

[11] Patent Number: 5,041,837
[45] Date of Patent: Aug. 20, 1991

[54] DIRECTIONAL ANTENNAS FOR A ROADSIDE BEACON SYSTEM

[75] Inventor: Yoshizo Shibano, Osaka, Japan

[73] Assignee: Sumitomo Electric Industries Ltd., Osaka, Japan

[21] Appl. No.: 326,435

[22] Filed: Mar. 16, 1989

Related U.S. Application Data

[63] Continuation of Ser. No. 26,359, Mar. 16, 1987, abandoned.

[30] Foreign Application Priority Data

Mar. 14, 1986 [JP] Japan ................................ 61-57370

[51] Int. Cl.[5] ................................ G01S 3/02
[52] U.S. Cl. ................................ 342/457
[58] Field of Search ................................ 342/457

[56] References Cited

U.S. PATENT DOCUMENTS

| | | | |
|---|---|---|---|
| 3,086,196 | 4/1963 | Sande . | |
| 3,735,335 | 5/1973 | Kaplan et al. | 342/457 |
| 3,757,290 | 9/1973 | Ross et al. | 342/457 |
| 4,209,787 | 6/1980 | Freeny, Jr. | 342/457 |
| 4,317,117 | 2/1982 | Chasek . | |

FOREIGN PATENT DOCUMENTS

| | | |
|---|---|---|
| 0020939 | 1/1981 | European Pat. Off. . |
| 0085013 | 8/1983 | European Pat. Off. . |
| 3306040 | 8/1984 | Fed. Rep. of Germany . |
| 0567533 | 1/1981 | Japan . |
| 229799 | 11/1985 | Japan . |
| 511113 | 11/1985 | Japan . |
| 511114 | 11/1985 | Japan . |

OTHER PUBLICATIONS

*Antennas*, Kraus, 1950, pp. 376, 381.
Patent Abstracts of Japan, V5N55 4/81 (E-52)[727].
IEEE Translation on Vehicular Technology, Feb. 1977.
Transaction for "Vehicle Automation Symposium, 8th", held on Jan. 22, 1985.

*Primary Examiner*—Thomas H. Tarcza
*Assistant Examiner*—David Cain
*Attorney, Agent, or Firm*—Sughrue, Mion, Zinn, Macpeak & Seas

[57] ABSTRACT

A roadside beacon system in which a plurality of roadside antennas transmit data to vehicles passing closely adjacent. The transmitting antennas are mounted high above the sides of the roads and have a gain pattern directed obliquely downward. The mobile antennas on the cars have gain patterns directed upwardly.

4 Claims, 3 Drawing Sheets

DIRECTIONAL ANTENNAS FOR A ROADSIDE BEACON SYSTEM

This is a continuation, of application Ser. No. 026,359, filed Mar. 16, 1987 now abandoned.

BACKGROUND OF THE INVENTION

1. Field of the Invention

This invention relates generally to a roadside beacon system. More particularly, this invention relates to a roadside beacon system which is used to calibrate the position of a vehicle and to perform data transmission in a navigation system in which, after data representing a departure point are inputted, vehicle speed data and direction data are inputted to enable the display of the present position of the vehicle.

2. Background of the Invention

A so-called "navigation system" for vehicles has been known in the art. In the system, a small computer and a small display unit are installed on a vehicle. A road map is read out of memory means such as a compact disk and displayed on the display unit. On the other hand, the vehicle speed data outputted by a vehicle speed sensor and the direction data provided by a direction sensor are inputted, so that calculation of the position of the vehicle and determination of the traveling direction of the vehicle are performed at all times. According to the results of the calculation and the determination, the vehicle is marked on the road map displayed on the display unit.

With the navigation system, the operator in the vehicle can visually detect the present position and the traveling direction of his vehicle therefore, he can reach his destination without losing his way.

However, the navigation system described above is disadvantageous in the following point. In the system, the errors inherent in the vehicle speed sensor and the direction sensor are accumulated as the vehicle runs. When the distance traveled by the vehicle exceeds a predetermined value (which is not always constant, being determined by the errors of the vehicle speed sensor and the direction sensor of each vehicle and by the environmental conditions of the positions where the sensors are installed), then the position of the vehicle displayed on the display unit is greatly shifted from the true position. That is, the system becomes unreliable and the vehicle operator may lose his way.

In order to overcome this difficulty, a so-called "roadside beacon system" has been proposed. In the system, as shown in FIG. 7, roadside antennas 2 are installed at intervals shorter than the distance within which the accumulated error exceeds the above-described predetermined value. The roadside antennas 2 are used to transmit signals including position data and road direction data to respective predetermined relatively small areas (R shown in FIG. 4). On the other hand, the signals thus transmitted are received through a mobile antenna 4 installed on a vehicle 3 so that the position and the traveling direction of the vehicle are calibrated with a computer (cf. FIG. 7).

With the above roadside beacon system, the accumulated error is smaller than the predetermined value, and the position of the vehicle 3 can be displayed according to the correct position data and the accurate direction data at all times. This means the navigation system is reliable. If the roadside antenna is installed, for instance, near a railroad or a railroad crossing where the direction sensor is liable to erroneously operate, then errors attributed to external factors can be effectively eliminated.

In the above-described roadside beacon system, roadside antennas of considerably high directivity are used to transmit the aforementioned signals. The vehicles receive the signals only when passing through the areas converted by the signals. A conventional mobile antenna is sensitive mainly in a horizontal direction and has a wide directivity. Therefore, the mobile antenna 4 receives, as shown in FIG. 7, not only a signal component E directly from the road-side antenna 2 (hereinafter referred to as "a directly received signal component" but also signal components F, D and C which are reflected by a sound insulating wall 5, a road 1, another vehicle 3*a*, a buildings, etc. (hereinafter referred to as "indirectly received signal components").

Accordingly, the time-dependent strength distribution of the signal received by the mobile antenna is greatly different form the time-dependent strength distribution of the original signal transmitted through the roadside antenna. Thus, the conventional roadside beacon system suffers from a difficulty that the position and the traveling direction of the vehicle are calibrated according to the signal which greatly deviates from the original signal.

This problem will be described in more detail. When compared with the directly received signal component, the indirectly received signal components, reaching the mobile antenna through various paths, are different in phase and in amplitude. Therefore, depending on the phases, the indirectly received signal components are received as signals much larger or smaller in amplitude than the directly received signals.

Whenever the present position for the vehicle is required, the vehicle is traveling. As the vehicle runs, the aforementioned number of signal paths change and accordingly the signal received by the mobile antenna also changes irregularly with time, as shown in FIG. 8, thus causing a great error in the calibration.

The above-described phenomenon will be referred to as "a multi-path fading phenomenon".

SUMMARY OF THE INVENTION

In view of the foregoing, an object of this invention is to provide a roadside beacon system in which the multi-path fading phenomenon is prevented, and the position of a vehicle can be calibrated with high accuracy.

The foregoing object of the invention has been achieved in a roadside beacon system in which according to the invention, a roadside antennas installed along roads at predetermined positions are larger in height than the vehicles and radiate signals obliquely downwardly. A mobile antenna for receiving signals transmitted through the roadside antennas is installed on each of the vehicles in such a manner that its directivity lies in an upward direction.

It is preferable that each of the roadside antennas have high directivity in a vertical plane crossing the road, and radiate signals substantially downwardly.

In the roadside beacon system of the invention, the roadside antennas installed along the roads at the predetermined positions transmit a variety of data to vehicles moving along the roads. In this operation, the roadside antennas radiate the signals obliquely downwardly and the signals are received by the mobile antennas which are directional in an upward direction.

Therefore, the signal component which is reflected by sound insulating walls or buildings or by the road, and the signal component which is reflected horizontally by another vehicle can be made much smaller in strength than the signal component which is directly received by the mobile antenna.

In the case where, as was described above, the roadside antennas are each highly directional in a vertical plane crossing a road, and radiate signals substantially downwardly, the signal component which is reflected by a sound insulating wall or building and then received directly by the mobile antenna can be decreased in signal strength when transmitted through the roadside antenna. That is, only the signal component transmitted from the roadside antenna directly to the mobile antenna can be made great in signal strength, whereas the other signal components reaching the mobile antenna through the other paths can be made much smaller in signal strength.

DETAILED DESCRIPTION OF THE PREFERRED EMBODIMENTS

One embodiment of this invention will be described with reference to the accompanying drawings in detail.

Figure 6:
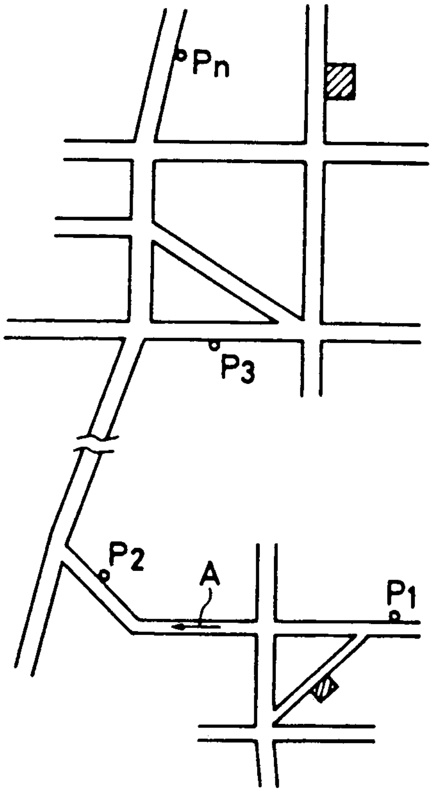
FIG. 6 is an explanatory diagram showing one example of a road map displayed on a display unit in the roadside beacon system.
Figure 7:
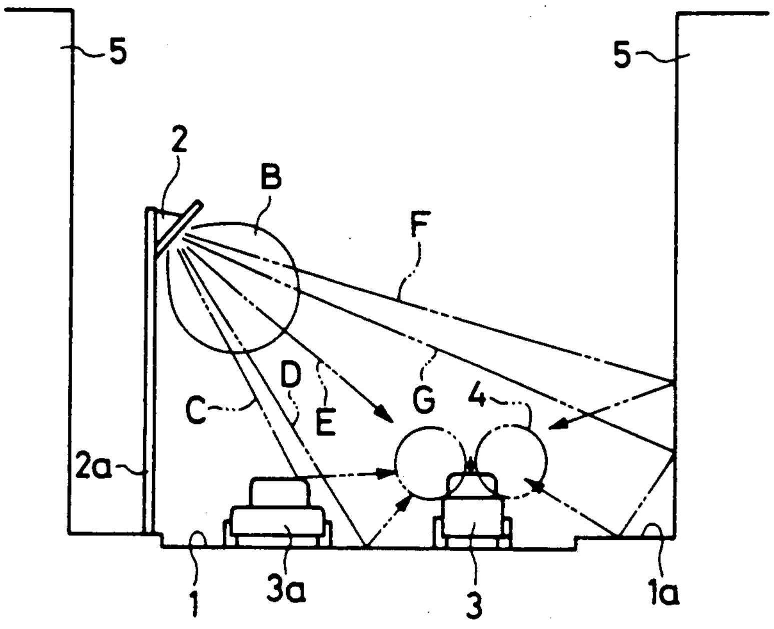
FIG. 7 is a schematic diagram for a description of one example of a conventional roadside beacon system.
Figure 8:
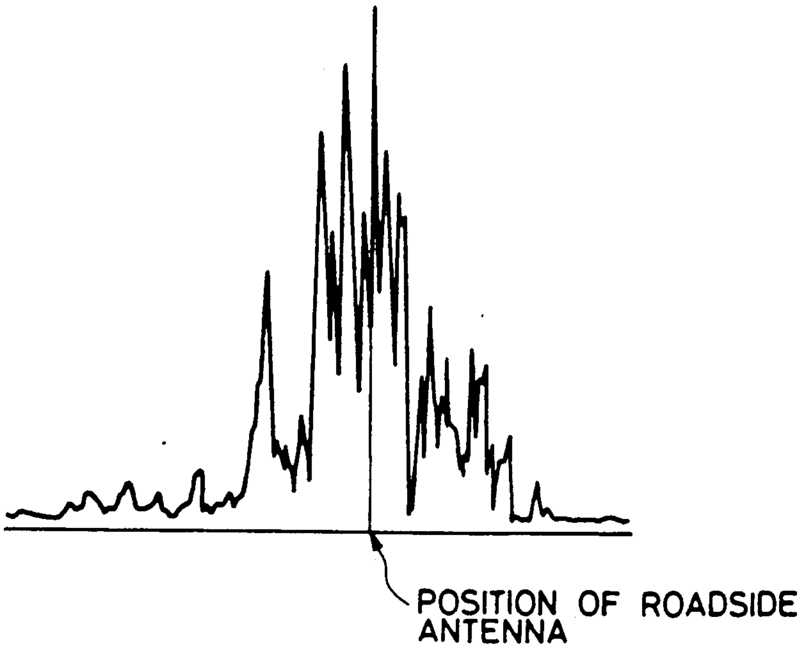
FIG. 8 is a diagram showing the waveform of a signal received by the conventional roadside beacon system.

FIG. 6 is a schematic diagram showing one example of a road map displayed on a display unit. The present position and the traveling direction of a vehicle is indicated by the arrow A, and the positions of roadside antennas $P_1$, $P_2$, . . . and $P_n$ are also indicated (the indication of these roadside antennas being not always required). In addition, buildings or the like (not shown in FIG. 6) which can be utilized as guides are indicated.

Figure 4:
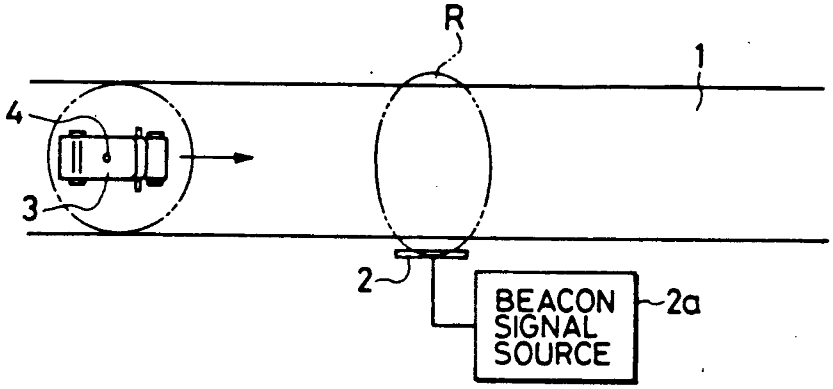
FIGS. 4 and 5 are a plan view and a perspective view, respectively, outlining a roadside beacon system.
Figure 5:
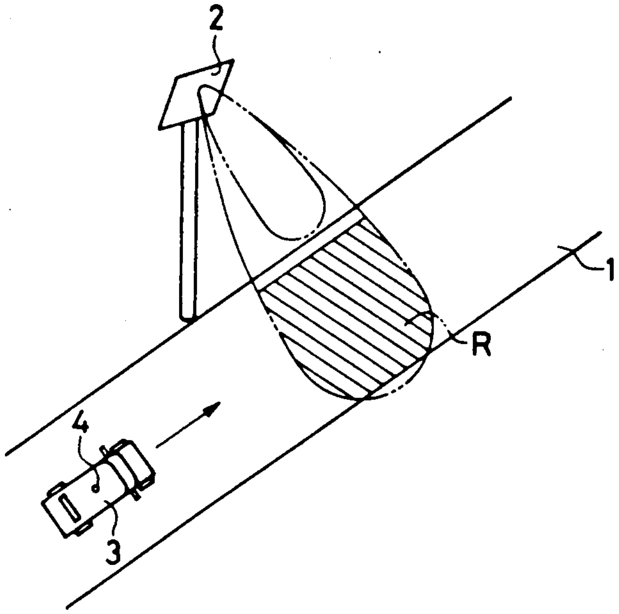

FIGS. 4 and 5 are schematic diagrams for a description of the roadside beacon system according to the invention. A roadside antenna 2 is installed at a predetermined position near a road 1. The roadside antenna 2 is adapted to transmit a signal from a beacon signal source 2*b*. On the other hand, a mobile antenna 4 for receiving the aforementioned signal is installed at a predetermined position on a vehicle 3 which runs along the road 1. The signal received by the mobile antenna 4 is supplied to a navigation device (not shown) in the car. The roadside antenna 2 is so high in directivity that it covers only a relatively small area (R in FIG. 4 or 5). In addition, the roadside antenna 2 is so designed that it is non-directional in a horizontal direction and radiates in an obliquely downward direction, i.e., the strongest signals are directed obliquely downward.

This type propagation directivity is obtained by a well known antenna such as a dipole antenna having reflection plate, a slot antenna or the like, which is commercially available.

Figure 1:
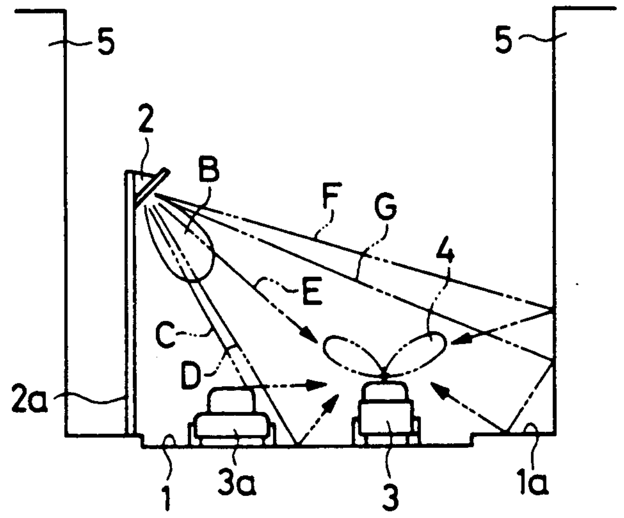
FIGS. 1, 2 and 3 are schematic diagrams for a description of first, second and third examples of a roadside beacon system according to this invention.

FIG. 1 shows the relation between the roadside antenna 2 and the mobile antenna 4 in detail. The roadside antenna 2 is supported by a post 2*a* installed near the road 1 in such a manner that the roadside antenna 2 is much greater in height than large vehicles such as trucks and buses. The mobile antenna 4 has a directivity in a obliquely upward direction, i.e., the sensitivity of the mobile antenna 4 is strongest in an upward direction, the antenna is installed on the roof of the vehicle 3.

The roadside antenna 2 shows a high directivity as indicated by B in FIG. 1, and is mounted on the supporting post 2*a* so as to transmit signals in a substantially downward direction.

Therefore, the signal highest in strength transmitted by the roadside antenna is reflected by the roof of another vehicle 3*a* toward the mobile antenna 4 as indicated by the line C in FIG. 1, or it is reflected by the ground and led to the mobile antenna 4 as indicated by the line D in FIG. 1. On the other hand, the signal lower in strength is transmitted directly to the mobile antenna 4 as indicated by the line E in the FIG. 1. A signal much lower in strength is reflected by a building 5 and led to the mobile antenna 4 as indicated by the line F in FIG. 1 or it is reflected by the building 5 and a road shoulder 1*a* and led to the mobile antenna 4 as indicated by the line G in FIG. 1.

In other words, the signals E and F are led to the mobile antenna 4 from above, the signal C is led horizontally to the mobile antenna 4, and the signals D and G are led to the mobile antenna 4 from below.

As was described above, the mobile antenna 4 receives all the signals C, D, E, F and G. In this case, the signal E is scarcely affected by the signals F and G, because the signals F and G are considerably low in strength because of the directivity of the mobile antenna. On the other hand, the signals C and D are higher in strength than the signal E. However, the signal E is scarcely affected by these signals C and D, because the signal C is horizontally led to the mobile antenna 4 and the signal D is led to the mobile antenna 4 from below while the directivity of the mobile antenna 4 lies in the obliquely upward direction as was described before.

Accordingly, the mobile antenna 4 receives the signal E with high sensitivity, but the other signals are received at the low levels which can be substantially disregarded. This effectively suppresses the aforementioned multi-path fading phenomenon, thus permitting the reception of signals in which the possibility of occurrence of errors is minimized.

The position data and the road direction data included in the signal received are utilized to cause a navigation device (not shown) to calibrate the vehicle position and vehicle traveling direction and to display this information.

Figure 2:
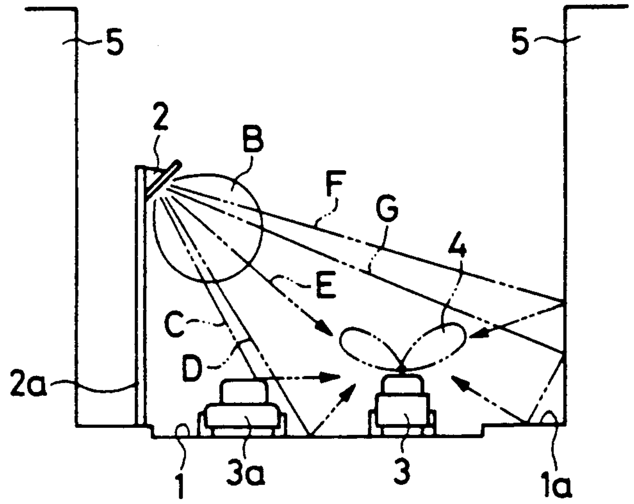

FIG. 2 shows a second embodiment of the invention. The second embodiment of FIG. 2 is different from the first embodiment of FIG. 1 only in that the roadside antennas 2 used are not so high in directivity.

Therefore, in the second embodiment, the signals C, D, E, F and G transmitted through each of the roadside antennas 2 are substantially equal in signal strength to one another.

The signals C, D and G are received by the mobile antenna 4 with low sensitivity similarly as in the first embodiment, and therefore the signal E is scarcely affected by these signals C, D and G. On the other hand, the signal F is received with relatively high sensitivity, thus greatly affecting the signal E. However, since a building 5 is not always present near the antenna, it is not inherently necessary to seriously consider the signal F. That is, the effect by the signal F can be positively eliminated by installing the roadside antenna 2 at a position where the signal F is not reflected by any nearby building 5.

Figure 3:
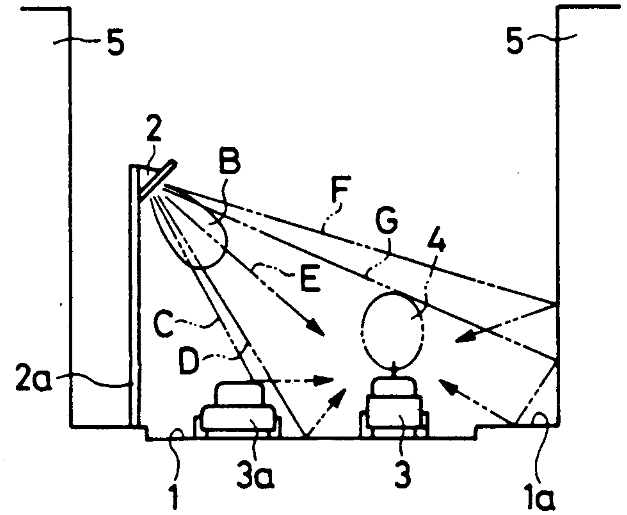

FIG. 3 shows a third embodiment of the invention. the third embodiment is different from the first and second embodiments only in that the directivity of the mobile antenna 4 lies in an upward direction.

In the third embodiment of FIG. 3, the mobile antenna 4 is substantially non-sensitive to signals in a horizontal direction and in an obliquely downward direction. Thus, similarly as in the above-described first and second embodiments, the multi-path fading phenomenon can be effectively suppressed.

As was described above, the roadside beacon system of the invention employs the mobile antenna the directivity of which is of an upward direction. Therefore, the signals reflected from a road, another vehicle and so forth are low in level when received by the mobile antenna. That is, the multi-path fading phenomenon is effectively suppressed. Therefore, the signals transmitted through the roadside antennas can be positively received with the occurrence of errors being minimized, and the number of pieces of data to be transmitted can be increased.

What is claimed is:

1. A roadside beacon system, comprising:

means for transmitting data to a plurality of vehicles on roads including a plurality of transmitting antennas located along side respective ones of said roads, each transmitting antenna being located at a height above said respective vehicles and having a propagation directivity pattern directed obliquely downwards; and mobile antenna mounted on each of said vehicles for receiving said transmitted data, each mobile antenna having a reception directivity pattern directed upwardly, wherein the reception of said mobile antennas is strongest in an upward direction.

2. A roadside beacon system as recited in claim 1, wherein said reception directivity pattern is directed obliquely upwardly toward both lateral sides of said each vehicle.

3. A roadside beacon system as recited in claim 1, wherein said propagation directivity pattern has a perpendicular to a principal direction of said respective road and passing through said antenna.

4. A roadside beacon system as recited in claim 2, wherein said propagation directivity pattern has a maximum directivity in a vertical plane passing perpendicular to a principal direction of said respective road and passing through said antenna.

* * * * *